Oct. 17, 1939.  R. B. GRAY  2,176,335

V-PULLEY

Filed March 7, 1938

INVENTOR
Russell B. Gray.
BY Harness, Dickey & Pierce
ATTORNEYS.

Patented Oct. 17, 1939

2,176,335

UNITED STATES PATENT OFFICE 2,176,335

V-PULLEY

Russell B. Gray, Detroit, Mich.

Application March 7, 1938, Serial No. 194,427

3 Claims. (Cl. 74—229)

This invention relates to pulleys for use with V-belts.

The main objects of this invention are to provide a V-belt pulley which will have less slippage than V-belt pulleys heretofore made; to provide a V-pulley which will keep the sides of the belt clean and thereby insure good gripping contact between the belt and the pulley; to provide a pulley which when in use will produce less noise than heretofore; to provide a pulley which will carry greater loads successfully than pulleys heretofore constructed, and to provide a pulley, the use of which will cause the belts run thereon to last longer than heretofore.

An illustrative embodiment of this invention is shown in the accompanying drawing, in which.

Figures 1, 2:
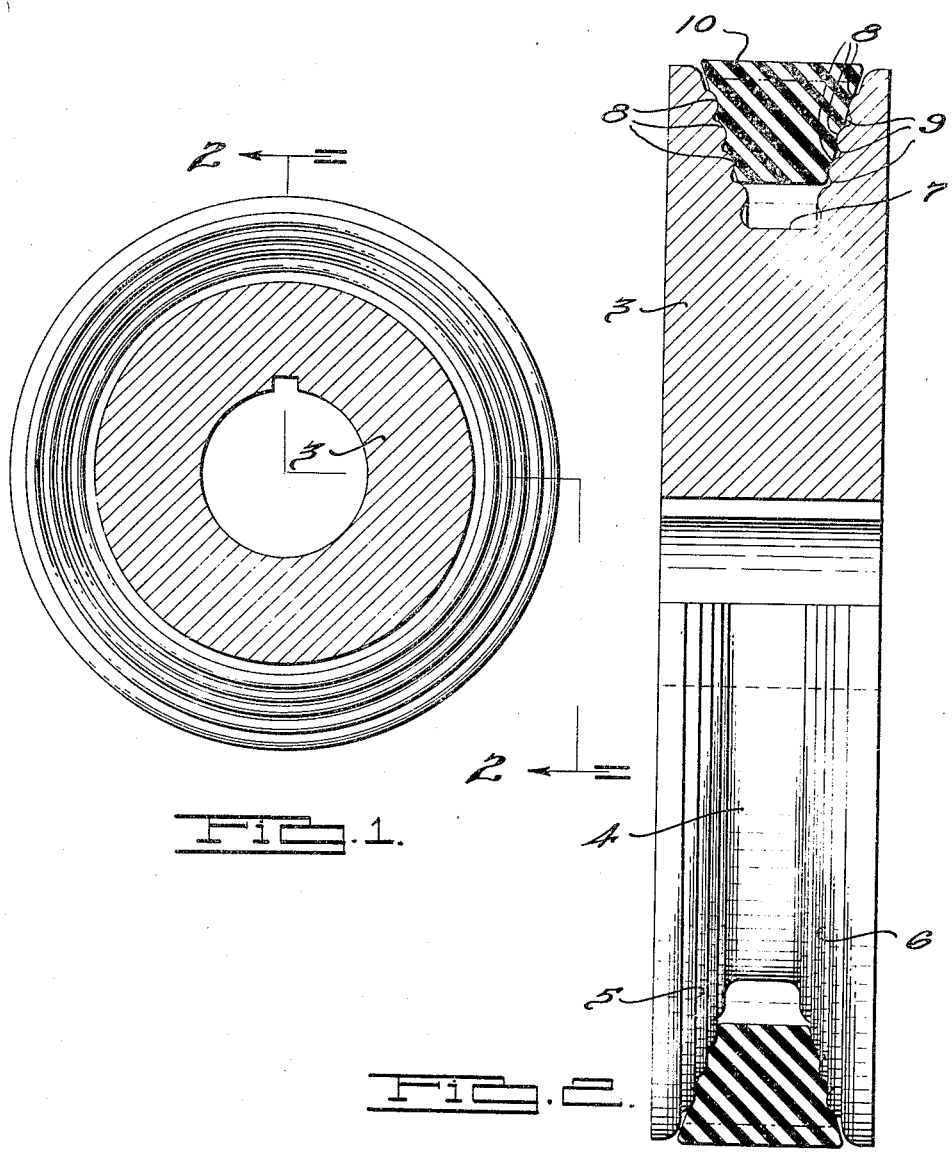
Fig. 1 is a sectional view of the improved pulley taken in a radial plane mid-way of its axial length.
Fig. 2 is an enlarged sectional view taken on the line 2—2 of Fig. 1, and showing the belt in position thereon, the belt being shown in section.

Heretofore considerable difficulty has been encountered, particularly in the use of V-belts and pulleys on refrigerator compressor units by reason of the accumulation and packing of dirt on the sides of the V-belt, the accumulation of which will cause the belt to slip.

It has been found that in many refrigerator compressor unit installations the dirt will accumulate in scale-like formation, and at times when these scaly accumulations are in contact with the side walls of the V-pulley at the time the refrigerator unit is started up, the electric motor driving the compressor will spin the driving pulley inside of the belt, and the friction between the belt and pulley will not be sufficient to drive the compressor through the initial compressing cycle with the result that the driving pulley will continue to spin inside of the belt and quickly burn it up and destroy it.

In many installations, such as refrigerator compressor units, the installations are such that attention to cleaning and adjusting the V-belt is done at very infrequent intervals. It is usually a case of where no attention whatever is paid to the installation until it fails for some reason to function. In the event that failure has been caused by the condition hereinabove described, then the V-belt has been ruined and it requires the installation of a new one.

Furthermore, it is highly desirable to have as quiet an operation of the V-belt and pulley wheel as is possible, particularly in such installations as refrigerator compressor units. Quietness contributes materially to reducing sales resistance and to the maintenance of satisfied customers.

In the construction shown in the drawing, a pulley 3 is provided with a V-groove generally designated 4 in the face thereof which comprises sloping side walls 5 and 6 and a flat bottom 7.

The sloping side walls are each provided with a plurality of radially spaced rounded topped annular ribs 8 which extend continuously and circumferentially about the axis of the pulley wheel, and the bases of which are radially spaced from each other, as indicated at 9.

As shown in full lines in Fig. 2 of the drawing, a V-belt 10, when relatively new and unworn, rides upon the rounded tops of the ribs 8 in substantially spaced relation to the flat bottom 7 of the groove, but after a long period of time the belt will eventually wear until it is down in the groove to the position indicated in dotted lines.

In the operation of this pulley, the ribs 8 embed themselves slightly into the belt 10 as the belt wraps around the pulley. At the point where the belt leaves the pulley, the ribs travel in a different path than the side walls of the belt, as is well understood, and at this time the ribs 8 produce a scraping action on the sides of the belt which keeps it clean and free from dirt and dust at all times and successfully prevents the accumulation of scaly dirt and dust on the sides of the belt.

By keeping the belt thoroughly clean at all times it will have a firm and intimate contact with the side walls or ribs of the pulley and will not have the tendency to slip that is present in flat sided pulleys, particularly where the sides of the belt have scaly accumulations of dirt.

It has been found in actual practice that when two installations of identically the same character as to motor horsepower, compressor resistance, pulley size, and belt size, one of which has the customary flat side walled pulley and the other having the herein described improved pulley, that there is a material difference in the amount of noise between the two installations. The flat side walled pulley produces materially more noise than the improved pulley herein disclosed.

Although but one specific embodiment of this invention has been herein shown and described, it will be understood that numerous details of the construction shown may be altered or omitted without departing from the spirit of this invention as defined by the following claims.

What is claimed is:

1. A pulley having a V-groove in the face thereof and a plurality of radially spaced, circumferentially extending ribs on the side walls of said groove.

2. A pulley having a V-groove in the face thereof, and a plurality of continuous, annular ribs on each of the sloping side walls of the said groove, the top surfaces of said ribs being of rounded contour.

3. A pulley having a V-groove in the face thereof, and a plurality of continuous, annular ribs on each of the sloping side walls of said groove, the top surfaces of said ribs being of rounded contour, and the bases of said ribs being spaced apart radially.

RUSSELL B. GRAY.